United States Patent [19]

Waldschmidt

[11] Patent Number: 4,944,541

[45] Date of Patent: Jul. 31, 1990

[54] TWO-HANDLED SHOVEL

[76] Inventor: Kenneth P. Waldschmidt, 309 E. 14th, Ellis, Kans. 67637

[21] Appl. No.: 260,533

[22] Filed: Oct. 20, 1988

[51] Int. Cl.⁵ ............................ A01B 1/22; B25G 3/38
[52] U.S. Cl. ................................... 294/58; 16/114 R; 294/54.5
[58] Field of Search ............... 294/2, 54.5, 57–59; 15/144 R, 145; 16/112, 114 R; 56/400.01, 400.04; 172/371, 372; 254/131.5

[56] References Cited

U.S. PATENT DOCUMENTS

| 62,594 | 3/1867 | Beale | 294/58 |
|---|---|---|---|
| 781,772 | 2/1905 | Gifford . | |
| 1,453,188 | 4/1923 | Ruppe | 294/58 |
| 1,534,075 | 4/1925 | Parrish | 294/58 X |
| 1,693,472 | 11/1928 | Batty . | |
| 2,470,217 | 5/1949 | McLoughlin | 37/130 |
| 2,520,606 | 8/1950 | McLoughlin . | |
| 2,521,441 | 9/1950 | Rickley | 294/58 |
| 2,531,227 | 11/1950 | Lubins | 294/58 |
| 2,826,835 | 3/1958 | O'Shea . | |
| 3,082,554 | 3/1963 | Steeb | 37/123 |
| 4,050,728 | 9/1977 | Davidson | 294/58 |
| 4,103,954 | 8/1978 | Vaslas | 294/54 |
| 4,615,553 | 10/1986 | Hultine | 294/58 |
| 4,690,447 | 9/1987 | Adams | 294/58 X |

FOREIGN PATENT DOCUMENTS

| 948860 | 8/1949 | France | 294/58 |
|---|---|---|---|
| 2481870 | 11/1981 | France | 294/58 |
| 568515 | 4/1945 | United Kingdom | 294/58 |
| 915288 | 1/1963 | United Kingdom | 294/58 |

Primary Examiner—Johnny D. Cherry
Attorney, Agent, or Firm—Rothgerber, Appel, Powers & Johnson

[57] ABSTRACT

An auxiliary grip handle and shaft are pivotally connected to a main shaft of an implement to reduce the back and shoulder strain associated with the use of implements, such as garden tools and snow shovels. The implement has the main shaft which is extended, a main grip handle secured thereto and an implement tool fastened to the bottom end of the main shaft. A brace pivotally connects the main shaft to the auxiliary shaft, which has the auxiliary grip handle fastened thereto. When the invention is used with a shovel, the auxiliary shaft is movable from a push position into a pull position. In the push position, the auxiliary shaft is at a small angle relative to the main shaft, enabling the user to apply a forward force on the shovel through both the auxiliary and main grip handles. In the pull position, the auxiliary shaft is at a larger angle in relation to the main shaft, enabling the user to pull upwardly on the auxiliary grip handle to exert a transverse force on the main shaft to lift the shovel. The brace that connects the auxiliary shaft to the main shaft is firmly attached to the main shaft and is secured to the auxiliary shaft by a bolt and a wing nut. Spaced apertures extend through the main shaft to permit repositioning of the brace to accommodate different sized users.

1 Claim, 5 Drawing Sheets

TWO-HANDLED SHOVEL

BACKGROUND OF THE INVENTION

1. Field of the Invention

This invention relates to shovels and other garden implements, and more particularly to shovels which have a modified two-handle structure so as to enable the user to use both handles to push the shovels and to lift the laden shovels by means of a pivotable second handle, thus enabling the user to shovel without exerting undue strain on the user's shoulders and back.

2. Description of the Prior Art

Shovels currently in use and on the market are composed of a grip handle connected to one end of an elongated shaft which is connected at the other end to a ground-engaging blade usually made of metal or plastic. In use, the shoveler pushes the shovel by gripping the grip handle at the end of the shaft until a sufficient amount of material is accumulated on the blade. At such time, the shoveler bends over and grips the shaft with his/her opposite hand at a point low on the shaft of the shovels. The shoveler then pulls upwardly on the shaft with such opposite, lower-positioned hand and tosses the accumulated material to a desired location. This activity exerts considerable strain on the shoveler's back and shoulders, due largely to the fact that the shoveler must repeatedly bend over, grasp the lower portion of the shaft and stand up straight as the shoveler pulls upwardly on the shaft to lift and toss the accumulated material from the blade.

Auxiliary grip handles have previously been provided on shovels. For example, modified snow shovels equipped with auxiliary grip handle contructions of one type or another are disclosed in Bickley, U.S. Pat. No. 2,521,441; Steeb, U.S. Pat. No. 3,082,554; Gifford, U.S. Pat. No. 781,772; Batty, U.S. Pat. No. 1,693,472; and Vaslas, U.S. Pat. No. 4,103,954. In addition, the use of auxiliary grip handles and portable shovels is disclosed by McLoughlin in U.S. Pat. No. 2,470,217 and 2,520,606. Moreover, auxiliary grip handles have been utilized in snow shovels to facilitate the directional pushing of snow by the shoveler, as disclosed in O'Shea, U.S. Pat. No. 2,826,835.

Some prior art inventions place grip handles at an intermediate point on the main shaft of a snow shovel. Such grip handles are rigidly attached to the main shaft and do not pivot during the snow shoveling operation. (See Gifford, Pat. No. 781,772 and Batty, Pat. No. 1,693,472.) Grip handles that are permanently attached to the main shaft of a snow shovel are not adjustable along the vertical extension of the main shaft. Moreover, such auxiliary grip handles are not extendable away from the main shaft, thus requiring the shoveler to bend over in order to grasp the grip handle and pull the laden shovel upwardly.

Other inventions in the prior art disclose hand grips disposed away from the main shaft, but such hand grips are on a rigidly positioned support that is not capable of pivoting during normal operation. (See Vaslas, Pat. No. 4,103,954.) Furthermore, some inventions in the prior art have auxiliary grip handles fashioned from extended wire cables whose terminal ends are either (1) connected to opposite top ends of a snow shovel scoop (Steeb, Pat. No. 3,082,554.) or (2) centrally connected directly to the scoop of the shovel. (See Bickley, Pat. No. 2,521,441.)

SUMMARY OF THE INVENTION

Applicant has studied prior designs of shovels in an endeavor to further reduce back and shoulder strain associated with shoveling and particularly snow shoveling, while facilitating efficient snow removal. Although auxiliary grip handles have been utilized in the prior art, no invention in the prior art combines the features embodied within applicant's invention in such a way as to minimize back and shoulder strain and at the same time facilitate a more efficient shoveling operation.

The present invention seeks to overcome the long-felt problem of back and shoulder strain in shoveling operations by providing an auxiliary shaft that is pivotally connected to a main shaft of a standard shovel. Both the main shaft and the auxiliary shaft of the present invention are provided with grip handles. The rigidity of the auxiliary shaft, as well as the rigid nature of the main shaft, permit the shoveler to transfer force through both shafts when pushing the shovel in an horizontal direction. The ability of the auxiliary shaft to pivot during the shoveling operation, permits the shoveler to push forward with both hands to accumulate material on a blade of the shovel and then to pull upwardly on the auxiliary grip handle and thereby lift the laden shovel, without the shoveler having to bend over and strain his/her back and shoulders. The shoveler is thus able to stand substantially erect and complete the shoveling operation without bending over to lift the laden shovel.

The present invention can also be utilized with implements that require the user to apply repeated downward and pulling forces on the implement to accomplish an operation. For example, the present invention can be utilized with a hoe or a rake to enable the user to apply force through the auxiliary shaft to facilitate hoeing and raking operations. The present invention allows one using the hoe or rake to perform tasks without the need to grasp the main shaft of the implement at a low position in order to exert downward and horizontal forces. The pivoting of the rigid auxiliary shaft allows the user to pull the implement towards him/her without the user having to reach forward or bend down to grasp the implement's main shaft, thus substantially reducing back and shoulder fatigue.

It is an object of the present invention to provide an improved shovel having both a main grip handle and an auxiliary grip handle to enable a shoveler to perform the task of shoveling without having to bend over or unduly strain the shoveler's back and shoulders when performing the shoveling operation.

Another object of the present invention is to provide a shovel with an extended handle that can be adjusted along the length of a main shaft in order to accommodate different sized shovelers.

An additional object of the present invention is to provide a pivotable auxiliary shaft provided with a grip handle to afford greater leverage to a shoveler so that the task of lifting a laden shovel will be less strenuous on the shoveler's shoulders and back.

Yet another object of the present invention is to provide a less cumbersome two-handled shovel that reduces interference with the shoveling operation.

A yet additional object of the present invention is to provide a simple, light weight and rugged shovel capable of extended and repeated use.

It is another object of the present invention to provide an easy to manufacture and economical shovel designed to reduce shoulder and back strain.

A further object of the present invention is to provide a two-handled shaft arrangement that can be utilized with a number of implements in order to reduce back and shoulder strain.

With these and other objects in mind, the present invention relates to a shovel with a modified two-handle structure so that the user can more effectively push the shovel to accumulate material thereon and can lift the laden shovel to perform the shoveling operation without having to bend over and exert undue strain on his/her shoulders and back. The present invention utilizes a prior art shovel having an extended main shaft with a main grip handle secured to its top end and a shovel blade securely fastened to its bottom end. The present invention improves that shovel by connecting an auxiliary shaft to the main shaft to form a modified shovel. The auxiliary shaft is pivotally mounted and can move in relation to the main shaft into a push position and a pull position. In the push position, the auxiliary shaft is positioned at a small angle relative to the main shaft, and in the pull position the auxiliary shaft is at a larger angle relative to the main shaft. An auxiliary grip handle secured to a top end of the auxiliary shaft is used to apply a pushing force to the modified shovel. Such force is mostly parallel to the main shaft, and is applied toward the shovel blade. The auxiliary grip handle is also effective in the pull position, where a shoveler applies an upward pulling force to the auxiliary grip handle. The upward force is applied in a direction generally transverse to the main shaft to lift material accumulated on the shovel blade and complete the shoveling operation.

In another embodiment of the two-handled shovel of the present invention, the main shaft is provided with a plurality of apertures extending through the main shaft at axially-spaced locations. The apertures in the main shaft extend perpendicular to a longitudinal axis of the main shaft, and are parallel to a plane defined by the shovel blade. These apertures are used to pivotally mount the auxiliary shaft to the main shaft in various, vertically-adjustable positions to accommodate the different sizes of shovelers performing the shoveling operation. The auxiliary grip handle is positioned in an overlapping relationship with the main shaft when the shoveler applies the forward pushing force to the modified shovel. The forward pushing force is applied to the shovel through both the main grip handle and the auxiliary grip handle, enabling the shoveler to effectively push the shovel with both hands to accumulate the material on the shovel blade. After accumulation of sufficient material on the shovel blade, the shoveler then pivots the auxiliary grip handle away from the main shaft so that a transverse pulling force can be applied to the auxiliary grip handle in order to pull the shovel blade upwardly so that the accumulated material can be tossed from the shovel blade.

Applicant's invention can be utilized with various implements, including gravel shovels, snow shovels, pitchforks, hoes, rakes and other implements having extended main shafts and that normally require the user to bend over and grasp the main shaft in order to pull the implement upwardly or towards the user. For example, referring to one embodiment of applicant's invention used with a hoe, the user grasps the main grip handle and the auxiliary grip handle, lifts the hoe by pulling back on the auxiliary grip handle, and positions the hoe forward to begin a hoeing stroke. The user then pulls the auxiliary grip handle towards him/her and at the same time applies downward force to the hoe through the auxiliary grip handle. The user simultaneously pulls the main grip handle towards him/her to move the hoe through and along the ground. As the hoe is pulled towards the user, the auxiliary shaft pivots away from the main shaft, permitting the user to maintain downward force on the hoe throughout the hoeing stroke.

BRIEF DESCRIPTION OF THE DRAWINGS

Other objects, features and advantages of the present invention will be apparent from an examination of the following detailed descriptions, which include the attached drawings in which.

DETAILED DESCRIPTION OF THE PREFERRED EMBODIMENTS

Figure 1:
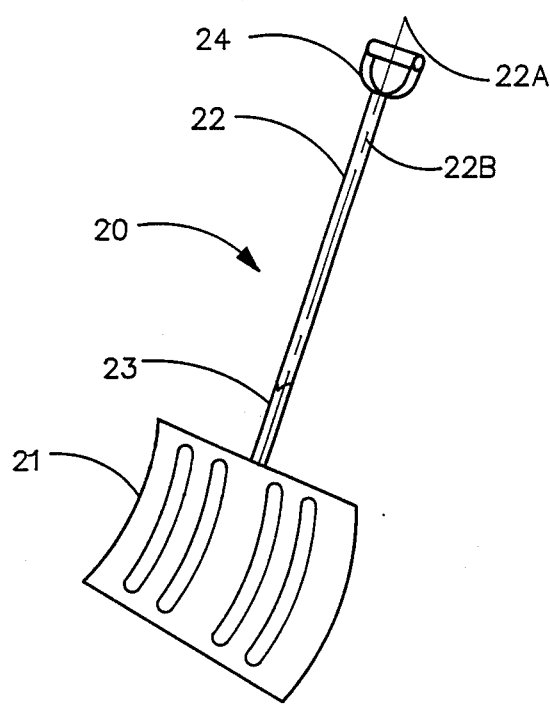
FIG. 1 is a perspective view illustrating a standard prior art snow shovel.

Referring now to the drawings, FIG. 1 shows a prior art snow shovel 20 comprised of a shovel blade 21 connected to a main shaft 22 by a sleeve 23 or other suitable means. The main shaft 22 has a longitudinal axis 22A. A main grip handle 24 is positioned at a top end 22B of the main shaft 22, and secured by suitable means.

Figure 2:
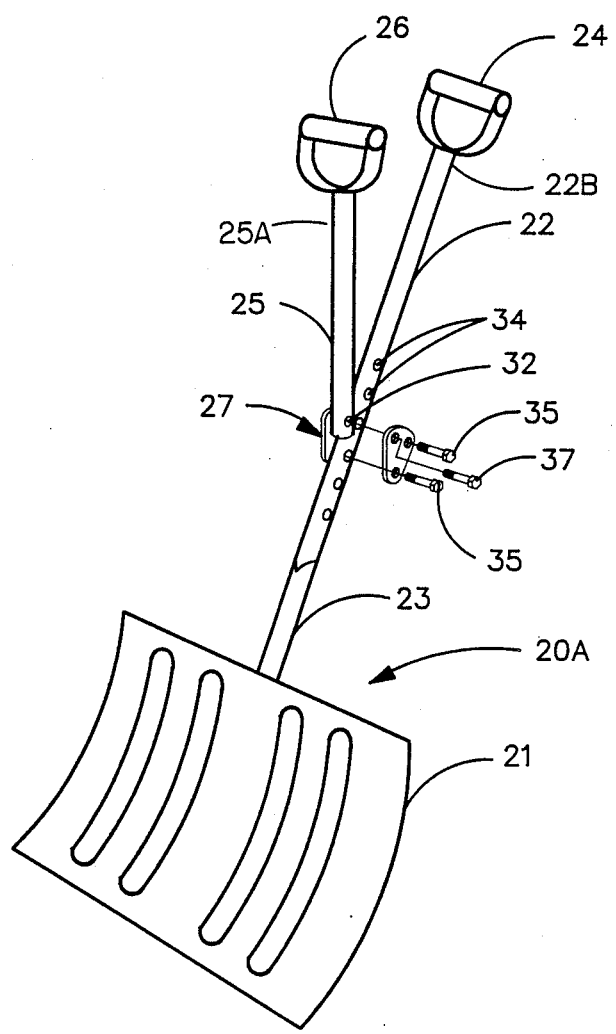
FIG. 2 is a perspective view illustrating a two-handled shovel in accordance with one embodiment of the present invention, wherein the main and auxiliary shafts connected to two grip handles are shown disposed from each other at a roughly 30 degree angle and connected by a brace.
Figure 3A:
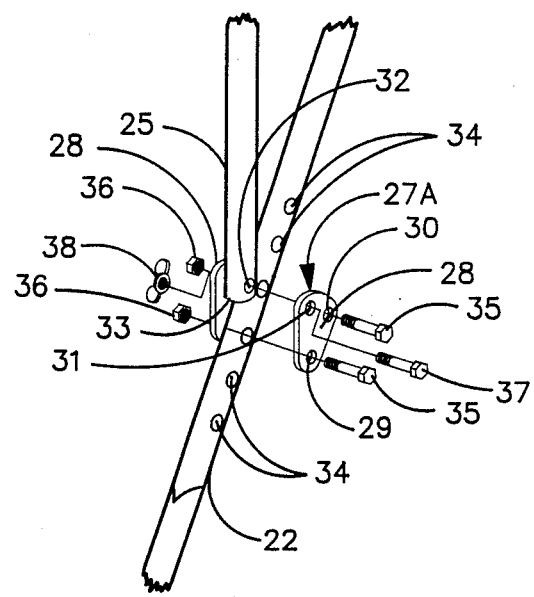
FIG. 3A is an exploded view of a two-piece brace showing the main and auxiliary shafts connected by three separate sets of nuts and bolts extending through the brace.

With reference to FIG. 2, a snow shovel 20A of the present invention is illustrated as a modification of the prior art snow shovel 20. An auxiliary shaft 25 has an auxiliary grip handle 26 attached at its top end 25A and is connected to the main shaft 22 by means of a brace 27. The brace 27 may be provided in one of several embodiments (See FIGS. 3A, 3B and 3C). In one preferred embodiment of the brace 27 shown in FIG. 3A and referred to as the brace 27A, the brace 27A is formed from two substantially triangular brace pieces 28 of metal or plastic. Three apertures 29, 30, and 31 are formed in each brace piece 28, one such aperture 31 aligning with an aperture 32 at a lower end 33 of the auxiliary shaft 25. The two other apertures 29 and 30 are formed in the brace pieces 28 to align with spaced apertures 34 in the main shaft 22. Bolts 35 extend through the lower apertures 29 and 30 in the brace 27A, extend through one of the apertures 34 in the main shaft 22 and are tightened by nuts 36 so that the brace 27A is securely fastened to the main shaft 22. Another bolt 37 extends through the uppermost aperture 31, through the brace pieces 28, through the aperture 32 formed in the auxiliary shaft 25 and is adjustably tightened with a wing nut 38. The wing nut 38 can be loosened or tightened to determine ease or difficulty of the pivoting of the auxiliary shaft 25 to and away from the main shaft 22, into and out of a push position (FIG. 5A) and a pull position (FIG. 5B).

Figure 3B:
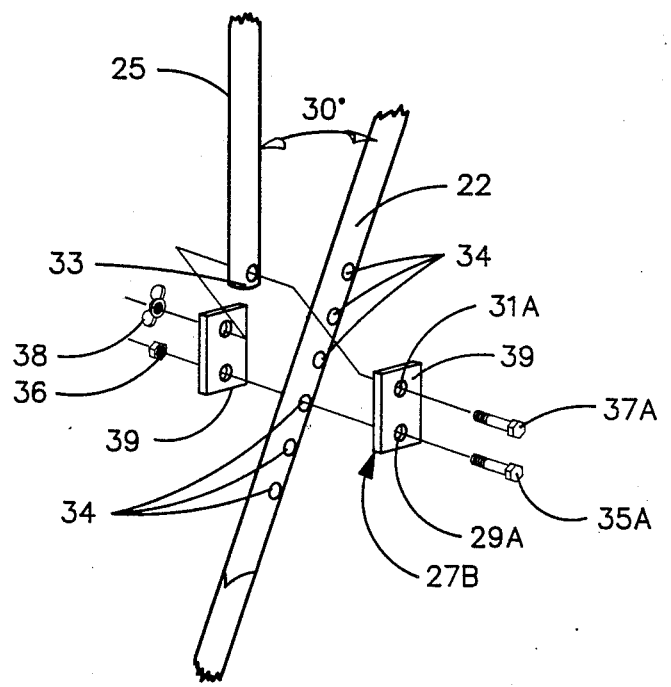
FIG. 3B is an exploded view of a second embodiment of the two-piece brace showing only two bolts extending through the brace pieces and the main and auxiliary shafts tightened by two nuts.

Another embodiment of the brace 27 is shown in FIG. 3B and is referred to as 27B. Two pieces of metal or plastic 39 each have two apertures 29A, 31A formed therein, to receive two bolts, 35A, 37A. One bolt 35A extends through the apertures 29A in the lower portions of the pieces 39, through one of the apertures 34 in the main shaft 22 and is securely tightened by a nut 36. A second bolt 37A extends through the top aperture 31A in the pieces 39 and is adjustably secured by the wing nut 38. In the preferred embodiment of the invention, the brace 27B is positioned in relation to the main shaft 22 at a 30° angle. This angle of the brace 27B is preferred since the pushing force is more effectively directed toward the shovel blade 21.

Figure 3C:
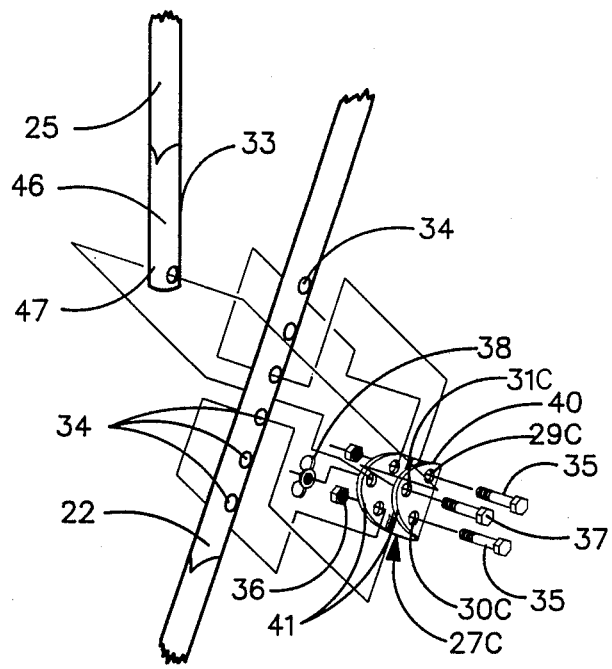
FIG. 3C is an exploded view of a one-piece brace showing the main and auxiliary shafts connected by three separate sets of nuts and bolts extending through the brace.

In another embodiment of the brace 27 shown in FIG. 3C and referred to as 27C, the brace 27C includes one U-shaped piece 40 of metal or plastic formed around the main shaft 22 and having two plastic or metal flanges 41 extending upwardly. The auxiliary shaft 25 is positioned between the flanges 41. As in FIG. 3A, the one-piece brace 27C shown in FIG. 3C has two apertures 29C and 30C formed therein to accommodate the bolts 35 that secure the brace 27C to the main shaft 22. Another bolt 37 extends through other apertures 31C and pivotally secures the auxiliary shaft 25 to the brace 27C and is tightened by means of the wing nut 38.

The spaced apertures 34 are formed in the main shaft 22. The aperatures 34 extend perpendicular to the longitudinal axis 22A of the main shaft 22 in the plane of the shovel blade 21. Adjacent ones or pairs of the apertures 34 are spaced to align with the apertures 29 and 30 in the brace 27 or with the apertures 29A and 30A in the brace 27C. The bolts 35 and 37 and the bolts 35A and 37A (FIG. 3B) should preferably be made of galvanized steel and should be approximately 1½ inches long with a diameter of ¼ inch. The spaced apertures 34 are located in the main shaft 22 spaced from the top end 22B to allow adjustment of all embodiments of the brace 27 along the main shaft 22 to permit selectable, vertical positioning of the auxiliary shaft 25 along the main shaft 22 to accommodate different sized shovelers 42.

Figure 6:
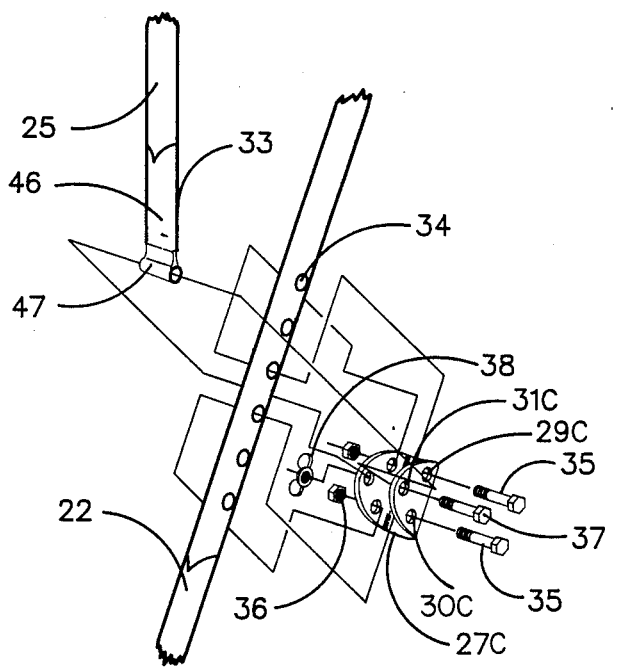
FIG. 6 is an exploded view of the auxiliary shaft, the main shaft and the brace made from one piece of metal or plastic wherein the auxiliary shaft is fitted with a metal or plastic sleeve having an aperture formed at its end to receive the bolt.

Referring now to FIG. 6, another embodiment of the present invention includes a metal or plastic auxiliary sleeve 46 connected to the end 33 of the auxiliary shaft 25. An eye 47 is formed at the end of the auxiliary sleeve 46. The eye 47 is aligned with the top aperture 31C in the brace 27C. The bolt 37 extends through the top aperture 31C and through the eye 47 and connects with the wing nut 38.

Figure 4A:
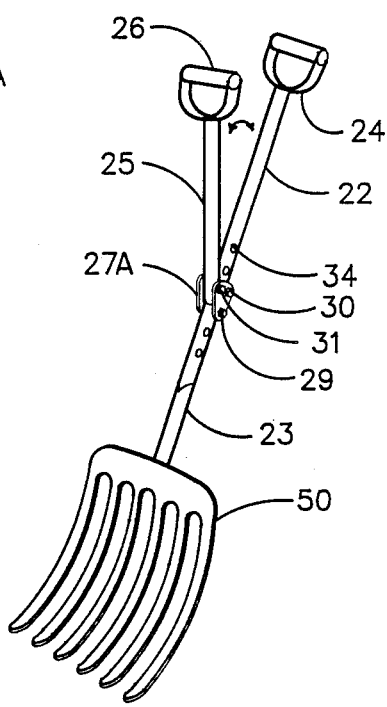
FIG. 4A is a perspective view of an embodiment of the present invention in which a pitchfork is provided with an auxiliary shaft connected to a main shaft by a brace.
Figure 4B:
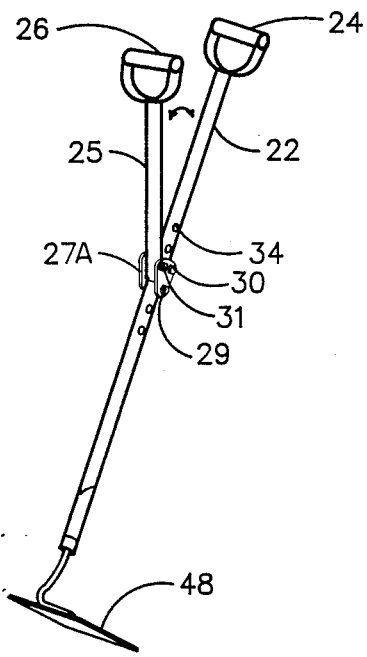
FIG. 4B is a perspective view of an embodiment of the present invention in which a hoe is provided with an auxiliary shaft connected to a main shaft by a brace.
Figure 4C:
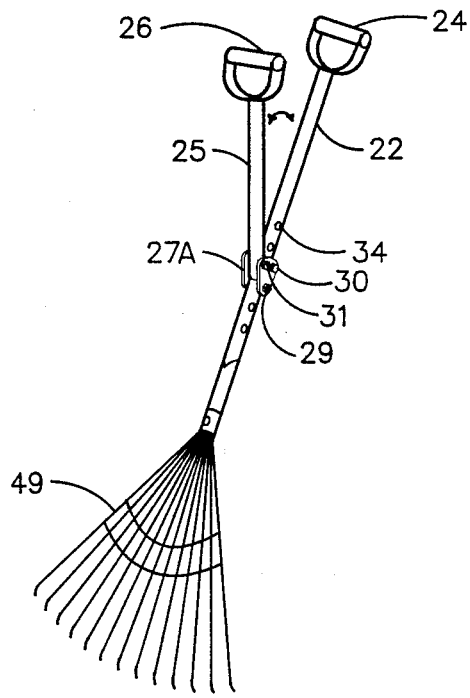
FIG. 4C is a perspective view of an embodiment of the present invention in which a rake is provided with an auxiliary shaft connected to a main shaft by a brace.

As shown in FIGS. 4A, 4B and 4C, the present invention can be used with various implements other than shovels, including a hoe 48, a rake 49, a pitchfork 50, and other implements having an extended main shaft 22 that normally require the shoveler 42 to bend over and grasp the main shaft 22 in order to use the implement. For example, in an embodiment of the present invention used with the hoe 48 (FIG. 4B), the user 42 grasps the main grip handle 24 and the auxiliary grip handle 25, lifts the hoe 48 by pulling up on the auxiliary grip handle 26, and positions the hoe 48 forward to begin a hoeing stroke. The user 42 then pulls the auxiliary grip handle 26 towards him/her and at the same time applies downward force to the 48 hoe through the auxiliary grip handle 26. The user simultaneously pulls the main grip handle 24 towards him/her to move the hoe through and along the ground. As the hoe 48 is pulled towards the user 42, the auxiliary shaft 25 pivots away from the main shaft 22, permitting the user 42 to maintain downward force on the hoe 48 throughout the hoeing stroke. Use of the present invention with the rake 49 (FIG. 4C) is essentially identical to that described above, whereas the use of the present invention with the pitchfork 50 is similar to that of the shovel 20A.

Figure 5A:
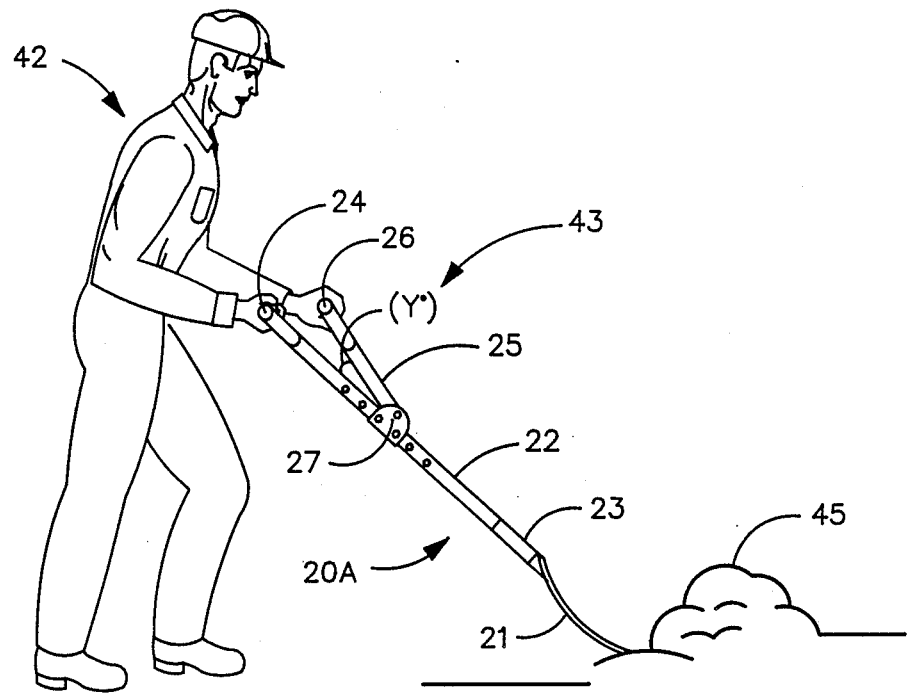
FIG. 5A is an illustration of the two-handled snow shovel of the present invention being used in the push position.
Figure 5B:
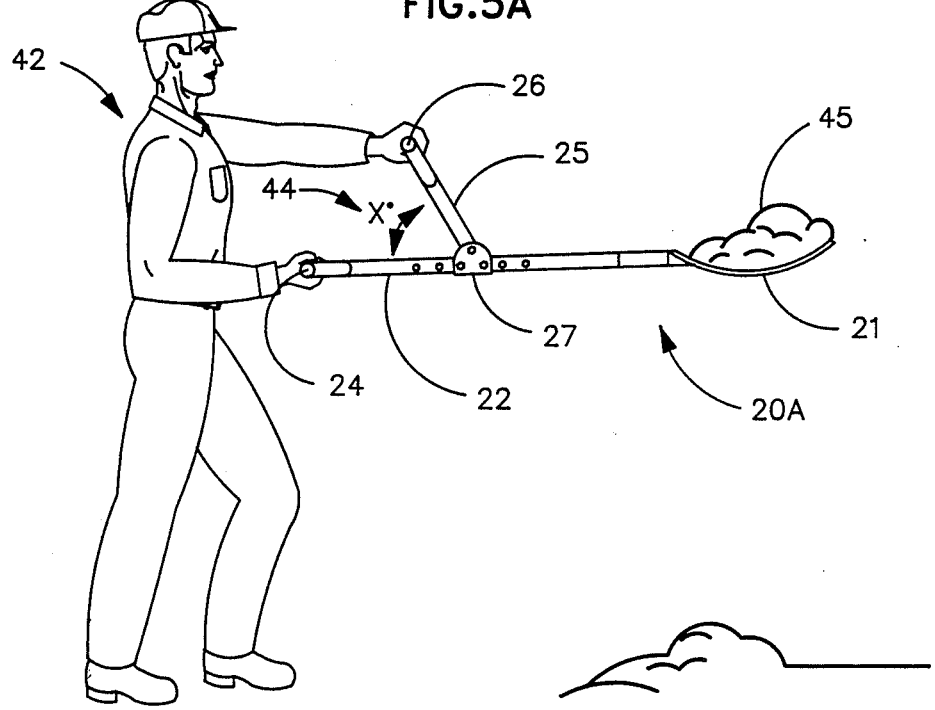
FIG. 5B is an illustration of the two-hanlded snow shovel of the present invention being used in the pull position.

The use of the principles of the present invention is illustrated in FIGS. 5A and 5B in terms of the use of the shovel 20A. The shoveler 42 grasps both the auxiliary grip handle 26 and the main grip handle 24 so that the auxiliary grip handle 26 is positioned in an overlapping relationship (the push position) with the main shaft 22 when the shoveler 42 applies the forward pushing force to the shovel 20A. See FIG. 5A where Y° is between the auxiliary shaft 25 and the main shaft 22. The shoveler 42 is thus able to push the shovel 20A with both hands to accumulate the material 45 on the shovel blade 21. After accumulation of sufficient material 45, the shoveler 42 then pivots the auxiliary shaft 25 to move the auxiliary grip handle 26 away from the main shaft 22 into the pull position (FIG. 5B) so that the transverse pulling force can be applied to the auxiliary grip handle 26 in order to pull the blade 21 of the shovel 20A upwardly to allow the accumulated material 45 to be tossed from the shovel blade 21. In proceeding from the push position (FIG. 5A) to the pull position (FIG. 5B) the shoveler 42 thus increases the angle 43 of the auxiliary shaft 25 in relation to the main shaft 22 from the smaller Y° until the auxiliary shaft 25 and main shaft 22 are separated by a larger angle 44 shown as the larger X°. (See FIG. 5B.) In the pull position (FIG. 5B) the shoveler 42 is standing substantially erect and the auxiliary shaft 25 is angularly disposed away from the main shaft 22 at the angle 44 so that the transverse force can be applied to the shovel 20A to toss the material 45 with less strain on the shoveler's back and shoulders.

It will be understood that the foregoing description of the preferred embodiments of the present invention are for purposes of illustration only, and that the various structural and operational features herein disclosed are susceptible to a number of modifications and changes, none of which entails any departure from the spirit and scope of the present invention as defined in the hereto appended claims. Accordingly, it should to be clearly understood that the form of the present invention described above and shown in the accompanying drawings is illustrative only and is not intended to limit the scope of the present invention to less than that described in the following claims.

What is claimed is:

1. A shovel for use by a shoveler to shovel material, comprising:

an extended main shaft having top and bottom ends, a longitudinal axis extending between said top and bottom ends and apertures spaced along said main shaft, said apertures extending through said main shaft perpendicular to said longitudinal axis;

a main hand grip secured to said top end of said main shaft;

a shovel blade fastened to said bottom end of said main shaft;

an auxiliary shaft having top and bottom ends, said auxiliary shaft having an aperture formed near said bottom end thereof;

a second hand grip securely attached to said top end of said auxiliary shaft;

a brace adjustably and pivotally connecting said bottom end of said auxiliary shaft to said main shaft at a point on said main shaft above the point at which said shovel blade is fastened to said main shaft, said brace including first and second members, each of said members having first and second ends and having first and second apertures formed near said respective first and second ends, said members being in spaced relation to each other with said main shaft in between so that each of said first apertures in said member is aligned with one of said spaced apertures in said main shaft;

first means extending through said first apertures of said members and through said one of said spaced apertures in said main shaft for securing said members to said main shaft;

second means extending through said second apertures in said members and through said aperture in said auxiliary shaft for pivotally securing said auxiliary shaft to said main shaft;

each of said members has a third aperture formed therein spaced from said first aperture therein; and third means extending through said third apertures and through another of said apertures in said main shaft for securing said brace on said main shaft at a fixed angle.

* * * * *